May 25, 1937.    J. V. MARTIN    2,081,436
SPEED PLANE
Filed June 6, 1933    9 Sheets-Sheet 1

Inventor
James V. Martin,
By Jas. V. Martin
Attorney

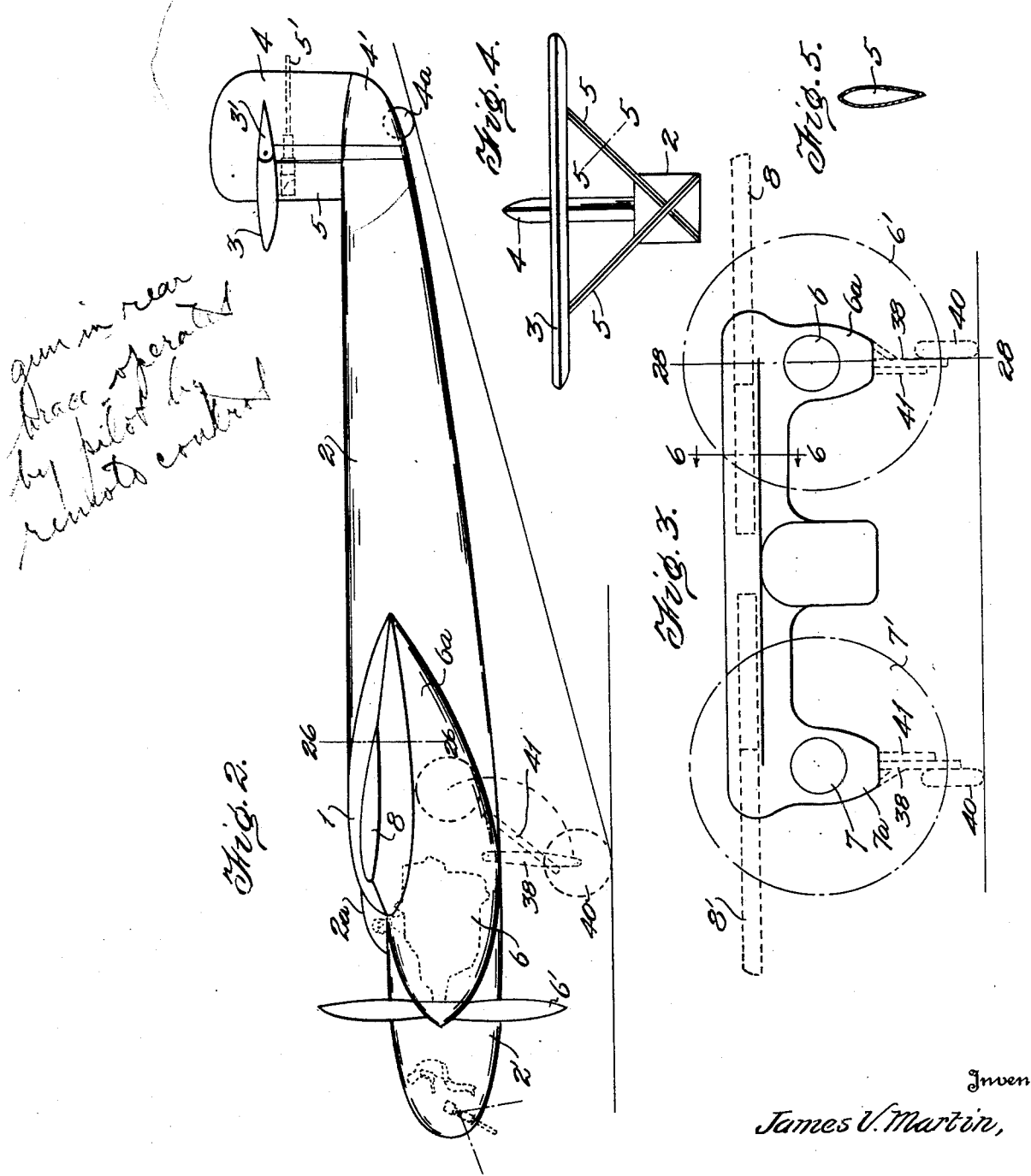

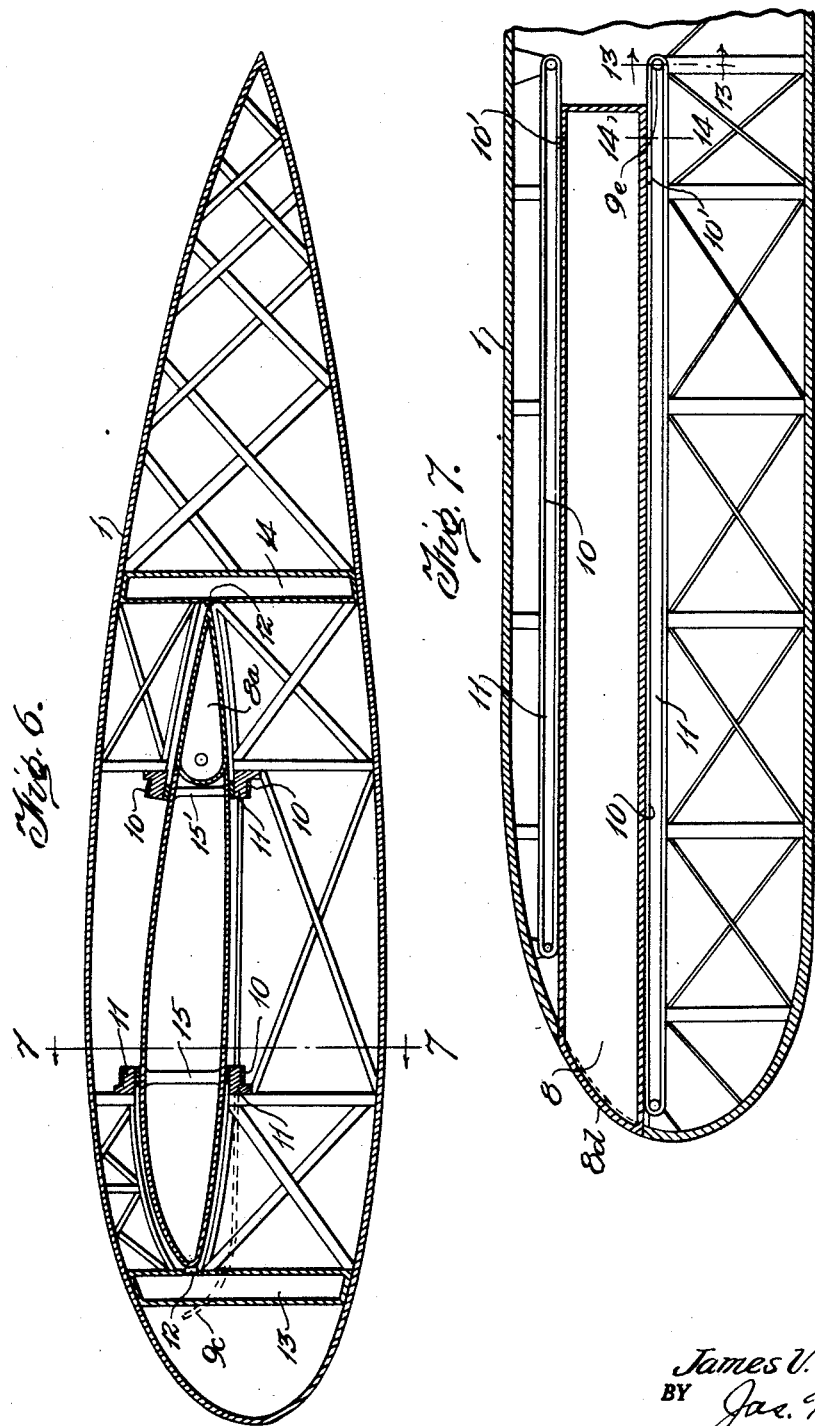

May 25, 1937. J. V. MARTIN 2,081,436
SPEED PLANE
Filed June 6, 1933 9 Sheets-Sheet 4
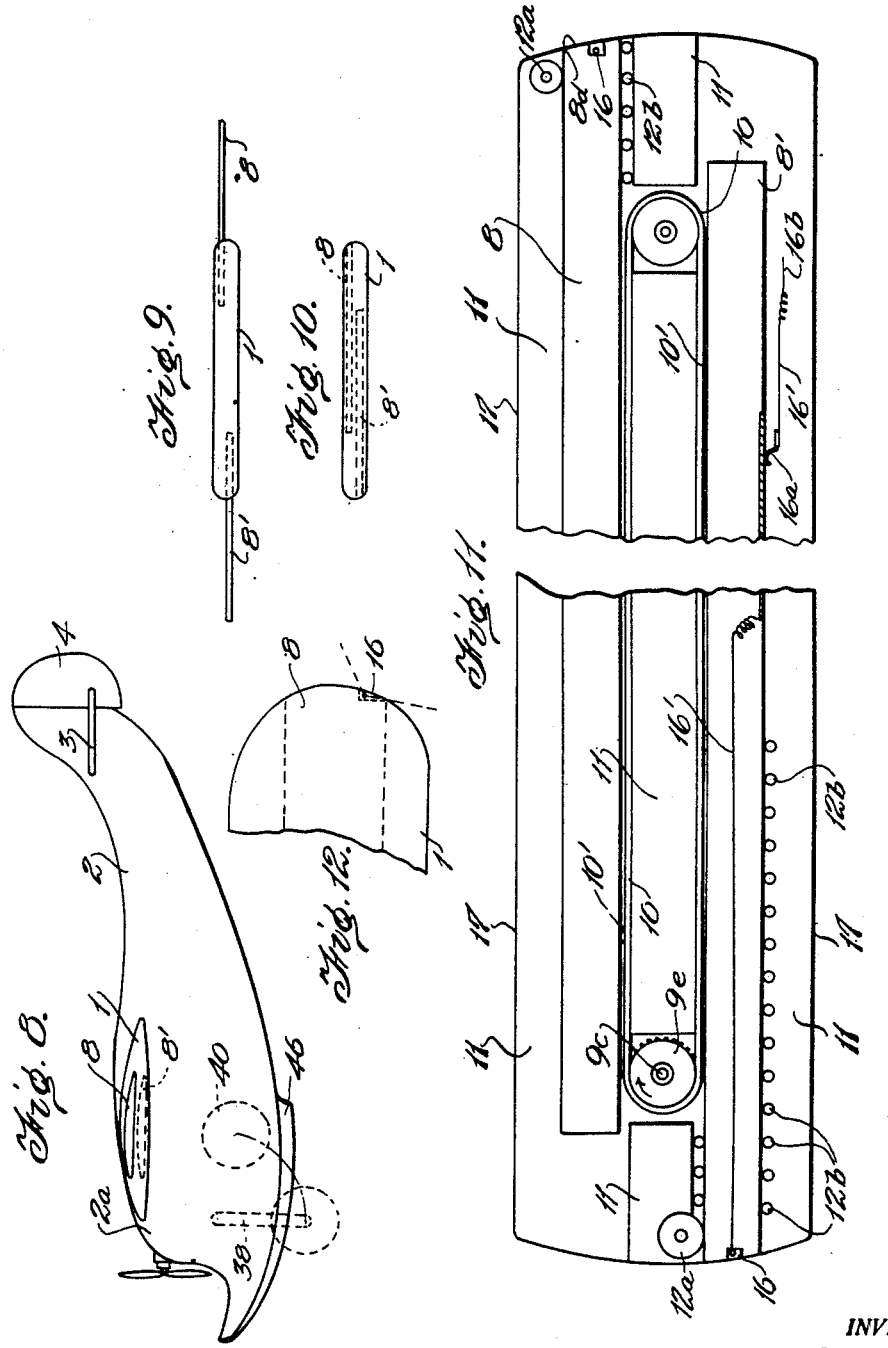
INVENTOR.
James V. Martin,
BY Jas. V. Martin
ATTORNEY

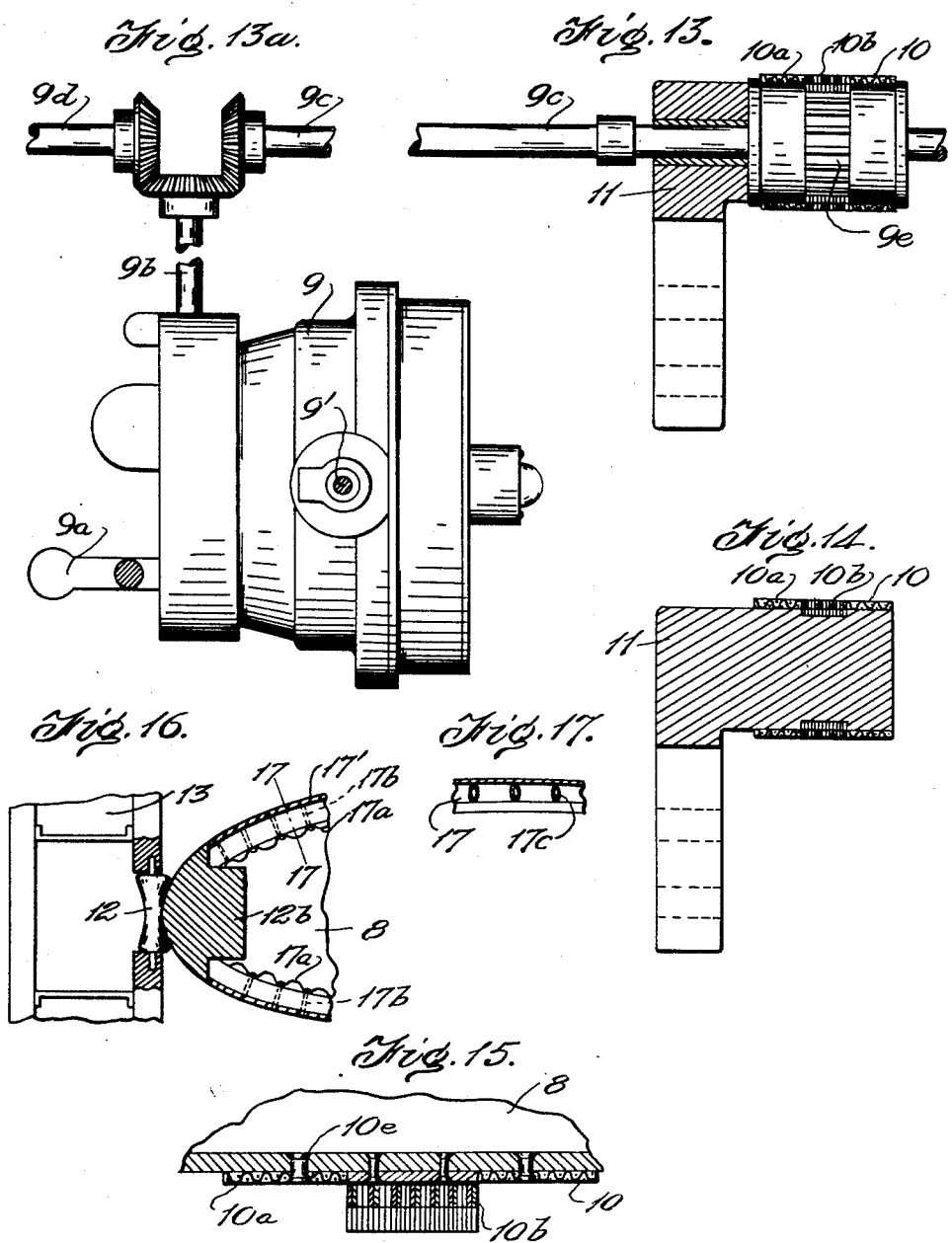

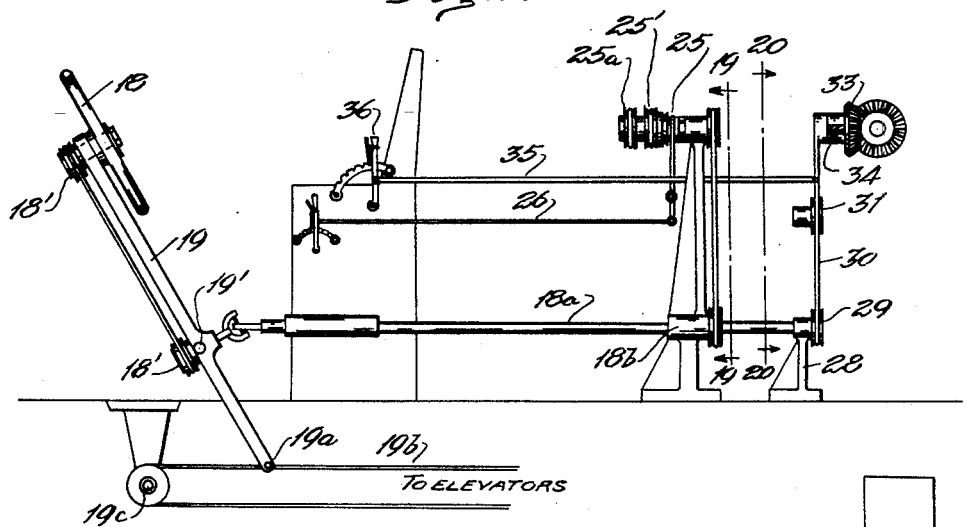
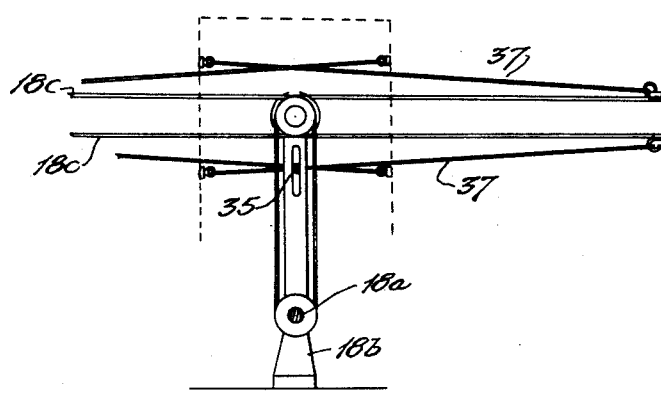
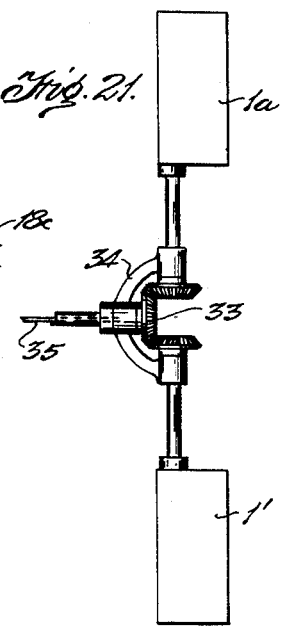
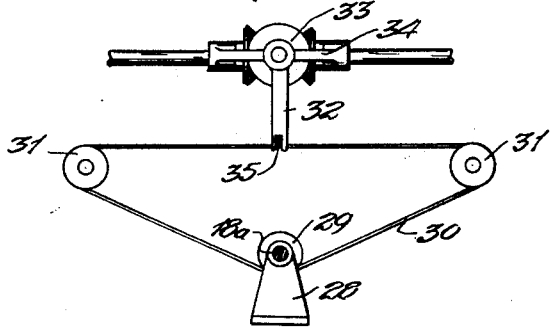

May 25, 1937. J. V. MARTIN 2,081,436
SPEED PLANE
Filed June 6, 1933 9 Sheets-Sheet 7
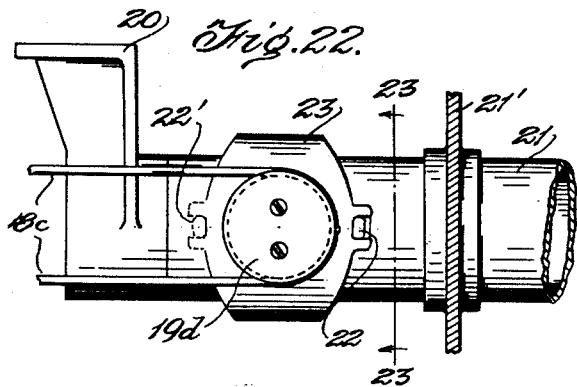
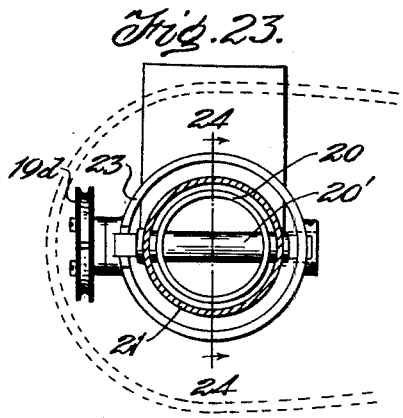
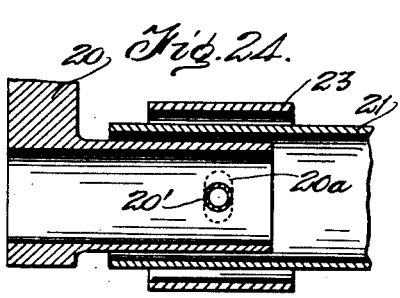
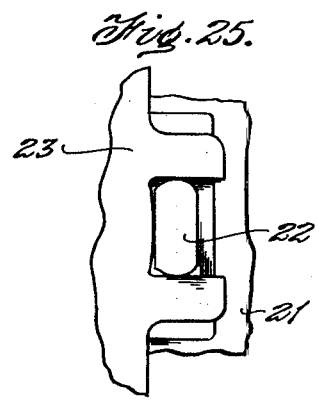
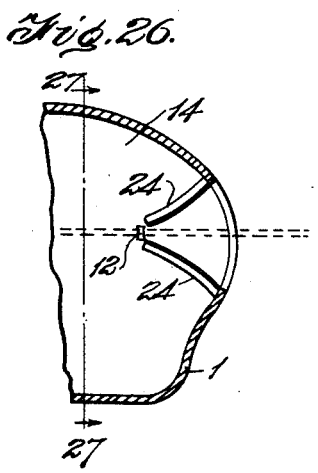
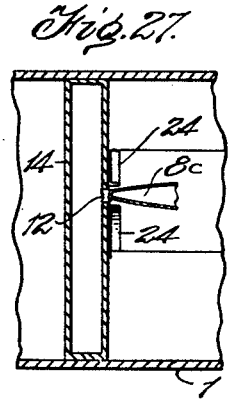
INVENTOR.
James V. Martin,
BY
Jas. V. Martin
ATTORNEY.

May 25, 1937.　　　J. V. MARTIN　　　2,081,436
SPEED PLANE
Filed June 6, 1933　　　9 Sheets-Sheet 8
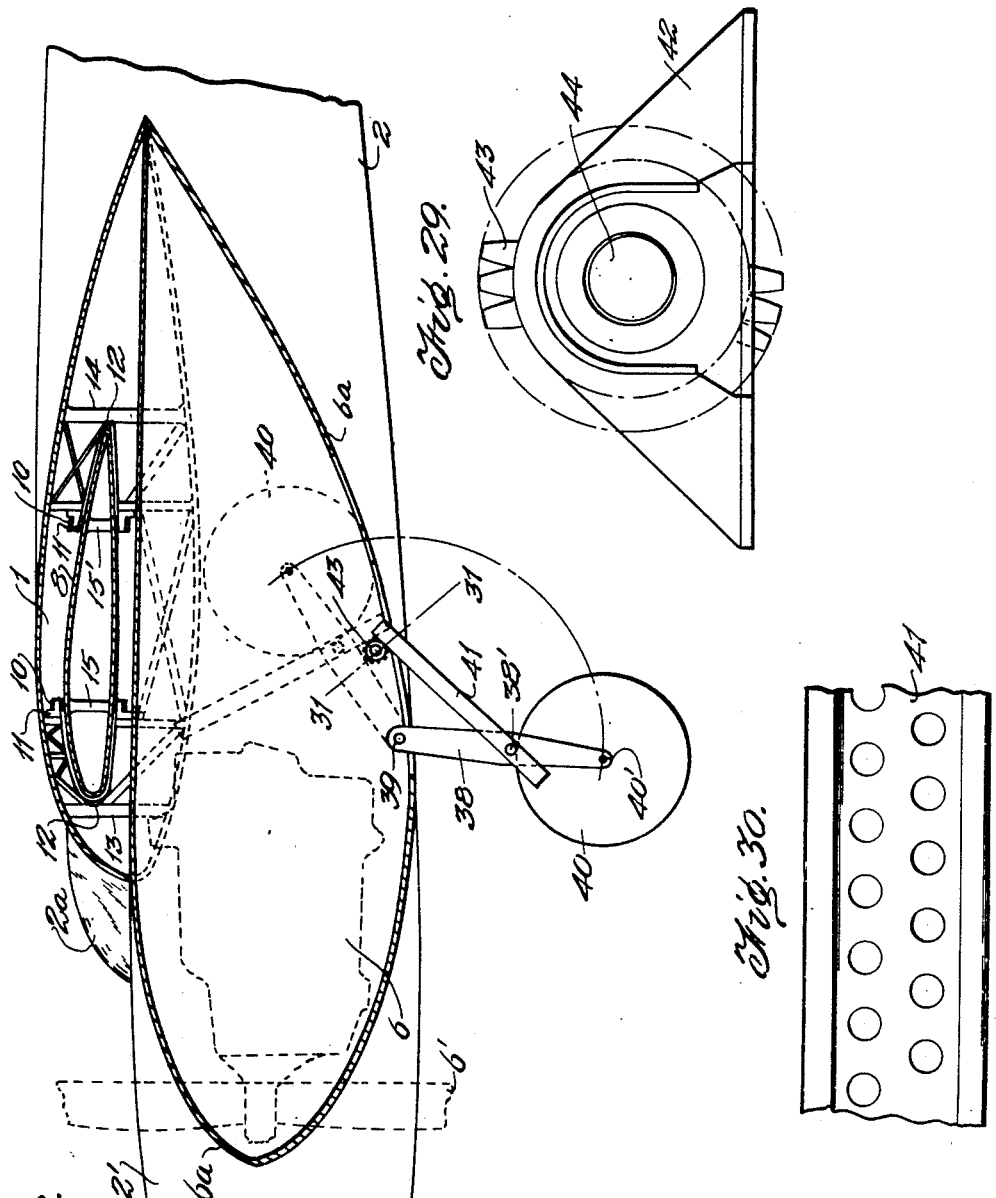
Inventor
James V. Martin,
Jas. V. Martin
By
Attorney May 25, 1937.  J. V. MARTIN  2,081,436
SPEED PLANE
Filed June 6, 1933  9 Sheets-Sheet 9
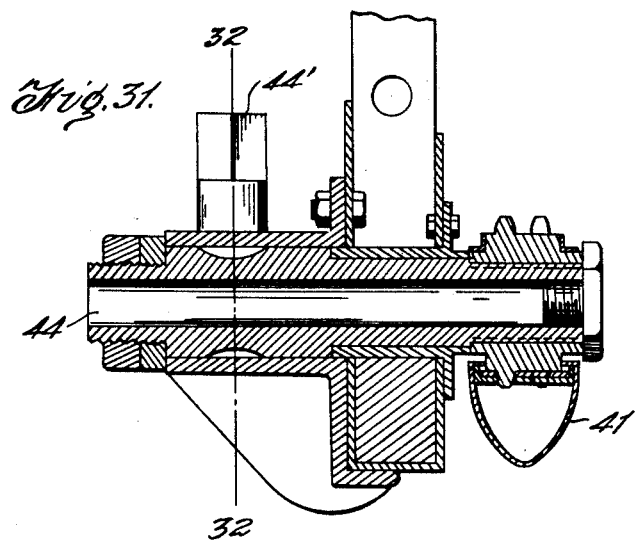
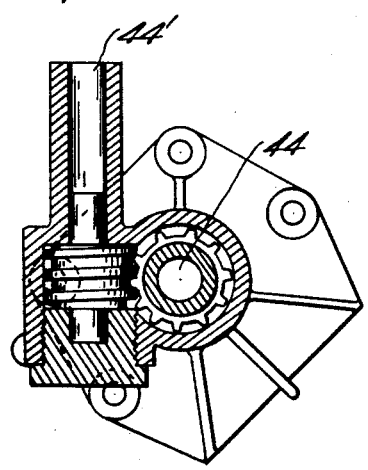
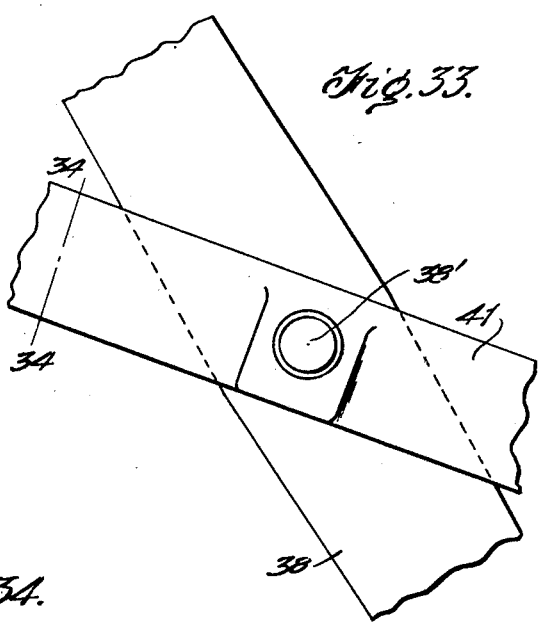
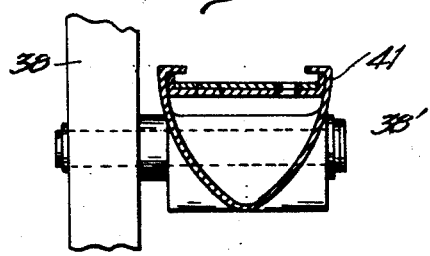
INVENTOR.
James V. Martin,
BY Jas. V. Martin
ATTORNEY Patented May 25, 1937

2,081,436

UNITED STATES PATENT OFFICE 2,081,436

SPEED PLANE

James V. Martin, Garden City, N. Y.

Application June 6, 1933, Serial No. 674,566

5 Claims. (Cl. 244—43)

This invention relates to aeroplanes and seeks to improve both the aeroplane flight and the aeroplane alighting efficiency by new combinations of well known parts.

It has long been realized by students of aviation that the wing area required for lifting the gross aeroplane weight at safe alighting speeds is far in excess of that required to carry the same weight at high velocities and the prior art shows various suggestions as to how this varying condition should be met, but all of the said suggestions leave many problems looking to the practical operation of variable wing area unsolved and it is the object of this invention to solve these problems and improve my former disclosures in Patent Nos. 1,672,985 and 1,627,191.

A further object of my invention is to provide means of greatly increasing the amount of retractable wing area and of adapting the aeroplane alighting supports and the lateral controls for the retracted and for the extended positions.

A still further object of my invention is to provide an improved airflow between the respective wing profiles and the motor or fuselage bodies and to provide, in combination with a thick central wing portion and an advantageous propeller position a novel means of preventing downwash on the empennage while saving tail drag and interference.

A further object is to provide improved gun placement for fighter aeroplanes.

A still further object is to improve my former retractable chassis disclosures, particularly Nos. 1,307,786; 1,418,008; 1,431,017; 1,847,094 and my Patent No. 1,937,007 of September 11, 1934 and also to provide an improved type of water and ground engaging rudder using an improved form of shock absorber such as detailed in my co-pending application No. 552,238, filed July 21, 1931.

A further object of my invention deals with improved and inclosed means of operating ailerons and for alternate aileron use, improving my disclosure of Patent No. 1,492,304.

Further objects of my invention will become readily apparent from the following description of the drawings:

Fig. 2 is a side elevation of the aeroplane.

Fig. 3 is a front elevation of the aeroplane.

Fig. 4 is a detail view showing empennage and bracing.

Fig. 5 is an enlarged section on line 5—5 of Fig. 4.

Fig. 6 is an enlarged detail section on line 6—6 of Fig. 3.

Fig. 7 is a section on line 7—7 of Fig. 6.

Fig. 8 is an outline side view of a modified arrangement of wings in which the auxiliary wings overlap when retracted.

Fig. 9 is a diagram showing the front of the modified wing arrangement with the auxiliary wings protruded.

Fig. 10 is a view similar to Fig. 9 but with the auxiliary wings retracted.

Fig. 11 is an enlarged diagrammatic view showing the arrangement of simultaneously operating the auxiliary wings of Fig. 9.

Fig. 12 is a plan view of the end of a main wing with the auxiliary wing retracted and showing the manner in which a side light on the auxiliary wing can act with the part retracted.

Fig. 13A is a view looking down on the servo motor.

Fig. 13 is an enlarged detail showing the servomotor used for protruding and retracting the auxiliary wings and its connection to the belt carrying said wings, the view being partly on the line 13—13 of Fig. 7.

Fig. 14 is a transverse section through one of the wing supporting rails and the belt moving thereover, the view being on the line 14—14 of Fig. 7.

Fig. 15 is an enlarged detail showing the manner of securing the fabric and link belts to the auxiliary wing.

Fig. 16 is an enlarged view showing the manner of supporting the leading edge of an auxiliary wing on rollers.

Fig. 17 is a detail section on the line 17—17 of Fig. 16.

Fig. 18 is a diagrammatic side view of the control arrangement for the ailerons of the main and auxiliary wings.

Fig. 19 is a section on the line 19—19 of Fig. 18.

Fig. 20 is a section on the line 20—20 of Fig. 18.

Fig. 21 is a plan view of the arrangement for actuating the main ailerons or alternately the flaps on the main wing.

Fig. 22 is a detail side view of the arrangement for rocking the ailerons on the extensible wings.

Fig. 23 is a section on the line 23—23 of Fig. 22.

Fig. 24 is a section on the line 24—24 of Fig. 23.

Fig. 25 is an enlarged view of the ball-socket type means of rocking the ailerons at right angles to the transverse axis.

Fig. 26 is an enlarged section on the line 26—26 of Fig. 2.

Fig. 27 is a section on the line 27—27 of Fig. 26.

Fig. 28 is a longitudinal section to enlarged scale on line 28—28 of Fig. 3 and showing the retractable alighting gear.

Fig. 29 is an enlarged side elevation of the pinion used to raise and lower the alighting gear, and Fig. 30 is a plan view of part of the rack for the above pinion.

Fig. 31 is an enlarged detail section on the line 31—31 of Fig. 28.

Fig. 32 is a section on the line 32—32 of Fig. 31.

Fig. 33 is an enlarged detail of the joint between the rack and the wheel strut.

Fig. 34 is a section on the line 34—34 of Fig. 33.

Proceeding now, with the more detailed disclosure of how my invention may be applied in practice, similar numerals will indicate like parts throughout the several views.

Figure 1:
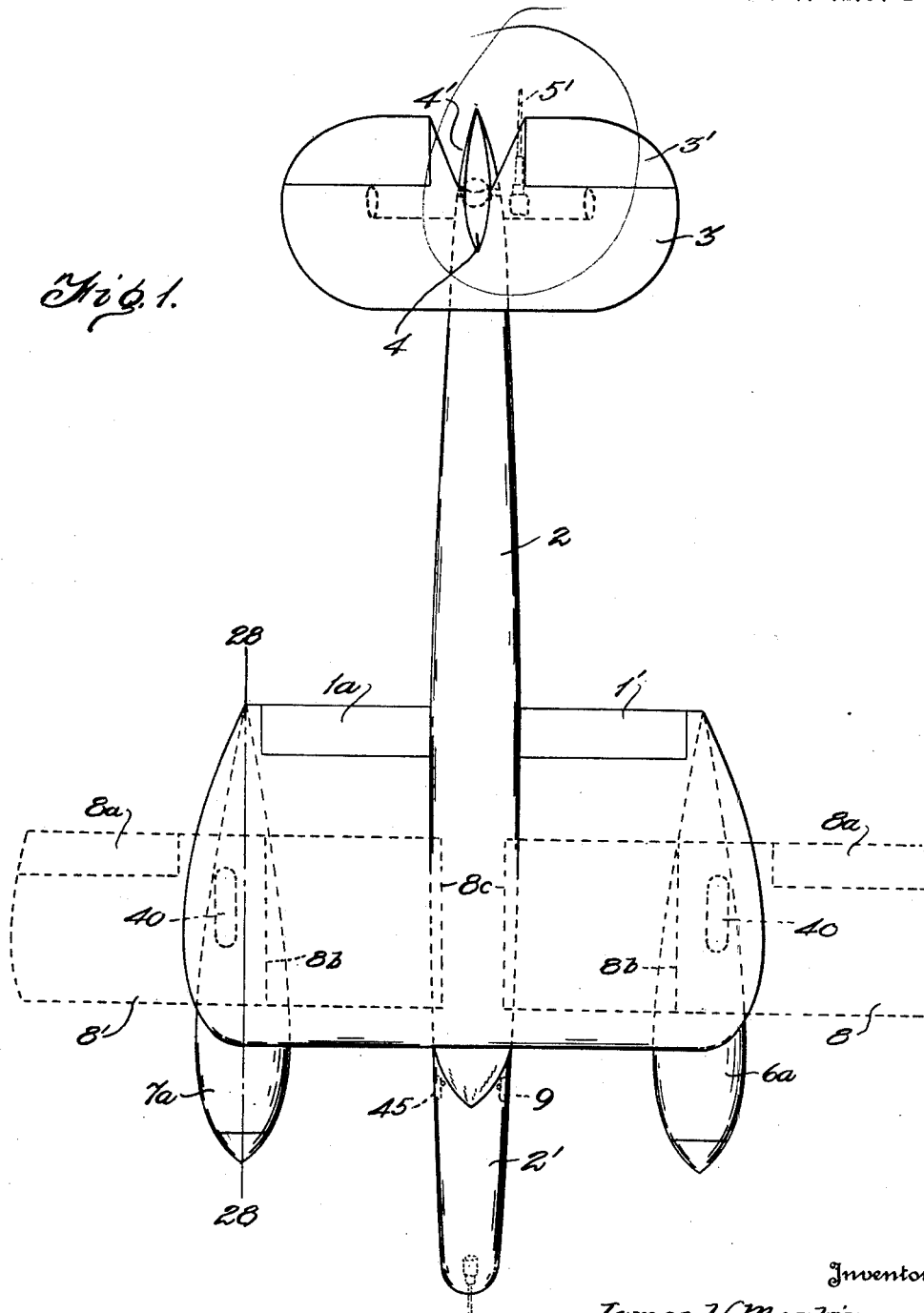
Figure 1 is a plan view of the complete aeroplane.

1 indicates the main or central wing of my speed plane to which the body or fuselage 2 is built and 2' indicates the forward portion of the fuselage with a transparent pilot's hood 2a and showing in dotted lines the forward gunner; it is contemplated to make suitable portions of 2' transparent for the said gunner.

3 indicates the inverted horizontal stabilizer while 3' is the rear flap thereof and Fig. 4 shows that the central and rear portion of this stabilizer is elevated above the rear of the fuselage 2 so that it may escape the "downwash" from the wings 1 and the slipstream from the propellers; the rudder 4 together with the two braces 5 securely hold the stabilizer in a desired position leaving the forward part thereof free from the interference of fins or braces commonly employed, but which seriously impair the airflow over the central portion of the aerofoil. The interference created by any given body impinges at a point to rearward of its cause, and I have found through wind tunnel tests that all of the positions heretofore used for the stabilizing control 3 when preceded by a comparatively thick main wing, i. e. thick enough to inclose its adequate trussing, affect the longitudinal control of the aeroplane adversely, even where a propeller blast somewhat mitigates the interference effect. To escape from adverse pitching interference throughout the flight range I have devised the high wing monoplane disclosed in Figs. 1, 2 and 3 and in wind tunnel tests found that for the disclosed wing, motor and body relationships shown a safe position for the stabilizer control may be determined as follows:—

The propeller hub should lie in a plane below the top of the main wing in its full flight attitude for horizontal flight and none of the motor or body parts should protrude prominently above said wing top: Such an arrangement I term a "high wing monoplane." The landing angle of such a plane may be defined as the acute angle subtended between the plane on which the aeroplane rests statically and the plane containing the chord of the main central wing portion. The chord of a wing may be regarded for the purposes of this specification as the longest line contained in the flight profile drawn through the trailing edge.

With these definitions in mind I find that a line drawn from the leading edge of the stabilizing control aeorfoil downwardly through the trailing edge of the main aerofoil and in a plane parallel with the path of flight should make a substantially larger acute angle with the chord of the main wing in the same flight plane than the aeroplane's landing angle as above defined. 4' indicates the lower part of the rudder which carries a ground engaging wheel 4a which has a guide such as shown in my serial application No. 552,-238, now co-pending. 5' indicates a rearwardly located machine gun supported partly in the brace 5 and which has remote control to the pilot's position 2a, leading within the brace 5 and the fuselage 2.

6 indicates the left motor in the aeroplane and 6' its propeller and 7 and 7' corresponding parts on the right side of the plane; the motors are each housed by a streamlined body or nacelle 6a and 7a respectively. Retractable wings 8 and 8' are shown on the left and right sides of the areoplane respectively and each said wing is provided with an aileron 8a at its rear outer edge. The larger central wing 1 is also provided with ailerons 1' and 1a which may be used as rear flaps to raise the landing lift reaction of the wing to which it is attached. 8b indicates in dotted lines the inner end of the retractable wing of non-overlapping type as shown in Fig. 1 when the wing is in extended position and this inner end moves inwardly to the dotted line position 8c when the wing is completely retracted so that its outer end makes a flush closure with the end of the large wing 1, see Fig. 7, and also to keep the bulk of the retracting wing over the chassis support.

To operate the retractable feature of my variable wing area a servomotor 9 is provided handy for the pilot to reach; this motor is fully disclosed in my Patent No. 1,627,985 and has a shaft 9' driven by the aeroplane motor 6. The aeroplane leaves the ground with the wings fully extended and climbs to any desired altitude, then the pilot moves the servo motor lever 9a to an operating position and the servo motor rotates the shaft 9b (Fig. 13A) and that actuates through bevel gears the shafts 9c and 9d. These shafts are flexible or lead through proper transmissions to the drive pulley 9e which operates the belt 10. This belt is supported by a rail or track 11 firmly incorporated with the internal wing truss of 1 and the retractable wings are attached at 10' to the belt. The belt can have a fabric part 10a and a central drive chain part 10b with rivets 10c holding the belt to the lower surface of the wing 8, see Fig. 15.

Rollers 12 guide the leading edge bar of the wings 8 and 8' along the rear of the front spar 13 of wing 1 and other rollers 12' perform like function at rear spar 14, see Fig. 6. The belts may all be driven or as preferred only one or two should be driven, the other belts serving as antifriction means for guiding the wings along the tracks. It will be noticed that I provide each retracting wing with a front spar 15 located directly between the forward tracks 11 and a rear spar 15' between the rear tracks to strengthen the wing against distortion at these positions.

When the wings are fully retracted so that their outer ends conform to the curve of the end of 1, the servo motor automatically stops operating, having in the meanwhile, stored within itself, sufficient energy to extend the wings when the pilot moves the lever 9a to the "out" position. Alternatively large rollers 12a see Fig. 11, can be used to take the bending moment on the upper track 11 as the wings 8 retract, since the stress at landing speeds and large angles of attack will be upward, and smaller rollers 12b can take the stress on the lower tracks.

In Figs. 8, 9, 10, 11 and 12 I show diagrammatically an alternative form of retractable wing called an overlapping wing which greatly increases the retractable area by permitting one small wing to telescope over the other within the central wing section. In Fig. 11 I also indicate how the side lights can be arranged in pockets 16 and connected with the pilot's position 2a by means of electric wires 16' and 16b through a trolley 16a.

The outstanding difficulties with retractable wings are the excessive bending stress at their junction with the larger wing, the small amount of retracting area and the lack of internal central wing strength to resist the excessive stresses due to the higher speeds permitted by retracting the smaller wings.

To overcome these problems I supply a light double wing surface or cover 17 (Figs. 16 and 17) having an outer metal surface 17', an inner corrugated surface 17a spaced apart by oval tubes 17c running transversely to the corrugations and held together by rivets 17b or welding; also for extremely high speed I overlap the retracting wings as shown in Fig. 11 so that in their completely retracted positions they unite with the rails 11 and the double skin 17 to reinforce the central wing strength. But in addition to the wing surface, which disposes material at the major axis, I provide spars 15 and 15' and advise that these be graduated in strength from a maximum at their junction with the wing in extended position. Naturally it will be understood that both wings must retract together and that all of my rails 11 are united with the wing covering 17 after the fashion shown in Figs. 6 and 7, and Fig. 8 shows a seaplane adaptation of my invention diagrammatic in outline, but substituting a hydroplane boat bottom with step 46 for the body bottom shown in Fig. 2 and a single propeller instead of the two indicated in Figs. 1, 2 and 3. If the nacelles or bodies 6a be omitted the landing gears can be housed in the boat body after the teaching of my Serials Nos. 675,156 filed Nov. 16, 1923, and 687,540 filed Aug. 30, 1933.

The very important elevated relation of my rear stabilizing control 3 is preserved through the upward swing of the body itself, but the control can be still further elevated by the means shown in Figs. 2 and 4, while the bodies 6a can be retained and the tires made into balancing floats after the teaching of my patent No. 1,973,007 issue Sept. 11, 1934. The pilot's position 2a is retained forward of the wing and below the upper surface thereof.

To operate the ailerons when the wings are extended. as for alighting, I provide a hand control 18 mounted rotatably on a stick 19, which rocks about the axis 19'; the stick is prolonged to connection 18a with rear elevator control wires 19b turning about pulley 19c (Fig. 18). By turning the wheel 18 the pilot rotates the pulleys 18' and by means of suitable connections shaft 18a in bearing bracket 18b, then by illustrated connections the endless wires 18c are operated to rotate the pulley 19d which forms part (Figs. 22 and 23) of the aileron rocking device located within the aileron skin adjacent the wing supporting the aileron. A wing bracket 20 carries pin 20' and journalled about this, but not touching 20 is the torque tube 21 of the aileron 8a to which all parts, as the rib 21', are secured. A slot 20a is provided in the tube 21 so that it may rotate through several degrees without contacting the pin 20'. Any suitable journal can be provided for the aileron tube at its outer connection to the wing 8, but at its inner connection it is supported by two lugs 22 and 22' one lug being on opposite sides of the said tube, these lugs, in turn are radiused and are supported in sockets in a rocking sleeve 23 which is journalled on the pin 20' and to which the pulley 19d is secured. It will be seen that rocking the sleeve 23 about the pin 20' by means of wires 18c will tilt the aileron 8 up and down as desired about its tube axis at right angles to the pin 20' and the ailerons on the extended wings can be operated differentially to raise one wing and to depress the other.

Figs. 26 and 27 show a means of guiding the aileron trailing edge into alignment with the rollers of the rear spar 14 of the main wing when the smaller wing is being retracted: Curved angle irons 24 guide the aileron 8a into path of rollers 12. But a disengaging clutch 25, Fig. 18, is available through control rod 26 and lever 27 so the pilot can disengage the operation of the ailerons at will and he can continue to operate the main wing ailerons 1' and 1a differentially by means disclosed in Figs. 18, 20 and 21. For example the shaft 18a passes through bracket 18b to another bearing in bracket 28 and rotates pulley 29 thereby actuating wires 30 about pulleys 31 at upper edges of fuselage, thence these wires lead to lever arm 32 which operates bevel gears 33 held in yoke 34 and ailerons 1' and 1a are thus differentially operated, but for use as rear edge flaps to the central wing both said ailerons can be downwardly deflected by the device of a rod 35 from lever 36 at pilot's seat to the lever 32 attached to yoke 34.

Each aileron 8a has a separate pulley 25' and 25a from which the wires 18c lead and I have provided light elastic aviator cords 37, Fig. 19 to pull the slack of the aileron wires into the fuselage when the wings are being retracted. Thus the retraction of the wings will automatically suspend their aileron operation while leaving the central wing aileron operation intact.

The chassis follow my teachings before noted; for example a cantilever strut 38 is journalled at 39 within the nacelle 6a aft of the motor and a rack 41 is journalled thereto at 38'. A wheel 40 is rotatably mounted at the lower end of strut 38 and it will be noticed that the rack extends on one side of and beyond the journal 38'. The upper end of the rack is held within the pinion carriage 42, Fig. 29, and the pinion 43 operates the rack in a well known manner by means of the flexible shaft drive 44' through worm and gear 44, but these in turn are operated by the servomotor 45 on the opposite side of the pilot position 2a and this servomotor is similar to that described (9) for retracting the wings. The servomotor 45 obtains its power from the right hand aeroplane motor and while it retracts both chassis it also stores up energy to extend them at the will of the pilot.

The dotted lines in Fig. 28 show the retracted positions of the wheel and chassis struts within the same streamline body which carries the motor weights and Fig. 1 will disclose how nicely the weights of the retracting wings are balanced above the said body and chassis.

The wing bracing and the double convex form of wings employed are important items of my invention since the double convex forms permit increased strength with room enough for the overlapping wings and with less drag resistance.

The hydroplane boat shown in Fig. 8 having a chassis retractable into the body and employing a step 46 and the two overlapping telescopic wings forms an important modification and it will be apparent that wide variations of my invention can be had without departing from the teaching and I do not care to be limited by the specific forms shown.

What I claim as new and desire to protect by Letters Patent is:—

1. In combination with a main wing of an areoplane, a telescopic wing housed therein, upper and lower rails attached to the internal bracing of the said main wing and a belt on one of the said rails guiding the said telescopic wing for relative transverse motion to the aeroplane's direction of flight.

2. In an aeroplane provided with inboard and outboard sets of ailerons, means available to the pilot to operate all said ailerons jointly to produce one direction of roll, means to disengage one set of said ailerons and means to move the inboard set of ailerons in either a single direction jointly or in opposite directions differentially.

3. In an aeroplane having a centrally disposed wing, comparatively smaller wings telescoping within the first said wing, means for relative movement between the said wings including a track guide rigid with said central wing and a traveling belt intervening between the said track and parts of the said smaller wing.

4. The combination in an aeroplane of a centrally disposed lifting wing and two smaller wings telescoping therewithin, the said central wing having guide rails for the smaller wings arranged transversely to the line of flight, the said smaller wings overlapping each other in their most retracted position and uniting with the said guide rails to form a reinforcing internal wing truss, whereby, with the smaller wings telescoped within the said central wing, the said central wing is strengthened for the high speed maneuvers of the said aeroplane.

5. An aeroplane including a centrally located wing of double convex contour and internally trussed for the high speed sustentation thereof, laterally extensible wings retractable to an overlapping relation within said central wing, three pairs of guide rails for supporting said retractable wings and forming part of the said trussing and extending transversely to the path of normal flight and one pair of said rails located between the upper wing contour of said central wing and the top of the uppermost of said overlapping wings, another pair of said rails located intermediate the said overlapping wings and the third pair of said rails located between the bottom of the lower of said overlapping wings and the lower contour of the said central wing and the foremost members of each pair of rails being substantially in vertical alignment and the rear members of said pairs of rails being in a like vertical position relative each other, whereby the said extensible wings when retracted cooperate with the said rails to strengthen the said central wing.

JAMES V. MARTIN.